US009883115B2

(12) United States Patent
Huang et al.

(10) Patent No.: US 9,883,115 B2
(45) Date of Patent: Jan. 30, 2018

(54) METHOD OF DETERMINING WHOLE-SCENE IMAGE BY USING MULTIPLE IMAGE-CAPTURING DEVICES

(71) Applicant: NATIONAL APPLIED RESEARCH LABORATORIES, Taipei (TW)

(72) Inventors: Chi-Hung Huang, Taipei (TW); Yung-Hsiang Chen, Taipei (TW); Wei-Chung Wang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 160 days.

(21) Appl. No.: 15/054,102

(22) Filed: Feb. 25, 2016

(65) Prior Publication Data

US 2017/0251149 A1    Aug. 31, 2017

(51) Int. Cl.
*H04N 5/247* (2006.01)
*H04N 13/02* (2006.01)
*G06K 9/00* (2006.01)
*G06T 7/00* (2017.01)
*G06K 9/52* (2006.01)

(52) U.S. Cl.
CPC ......... *H04N 5/247* (2013.01); *G06K 9/00771* (2013.01); *G06K 9/52* (2013.01); *G06T 7/0018* (2013.01); *H04N 13/0242* (2013.01); *H04N 13/0246* (2013.01)

(58) Field of Classification Search
None
See application file for complete search history.

(56) References Cited

U.S. PATENT DOCUMENTS

| 8,248,476 B2* | 8/2012 | Ke | G01B 11/24 348/180 |
| 2013/0063570 A1* | 3/2013 | Michopoulos | G01B 11/165 348/47 |
| 2013/0070048 A1* | 3/2013 | Huang | H04N 13/0242 348/36 |

* cited by examiner

*Primary Examiner* — Andy Rao
*Assistant Examiner* — Tyler Edwards
(74) *Attorney, Agent, or Firm* — Chih Feng Yeh; Huntington IP Consulting Co., Ltd.

(57) ABSTRACT

The present invention discloses a method of determining a whole-scene image by using multiple image-capturing devices, and the method has two main features including non-contact formation digital image method and the parallax elimination process for captured images. The former feature uses a concyclic fitting calculation to easily determine the locations and orientations of the image-capturing devices, so as to achieve the objective of assisting in capturing the whole-scene image. The latter feature can effectively improve the image quality, so as to effectively solve the problems in conventional technology.

8 Claims, 6 Drawing Sheets

METHOD OF DETERMINING WHOLE-SCENE IMAGE BY USING MULTIPLE IMAGE-CAPTURING DEVICES

BACKGROUND OF THE DISCLOSURE

1. Technical Field

The present invention relates to a method of capturing a whole-scene image, more particularly to a method of determining the whole-scene image by using multiple image-capturing devices and a concyclic fitting calculation to determine locations and orientations of the image-capturing devices. The method of the present invention can be applied to measure multi-angle large-range area displacement and deformation, and also applied in a whole-scene security monitoring system.

2. Background of Related Arts

Digital image correlation was revealed in 1980s and includes technologies of interpolation of digital image value and affection of the subimage's size on convergence time and accuracy. Sequentially, the digital image correlation method is applied in various applied mechanics, such as surface profile measurement, automatic measurement system in cooperation with digital images, or large-deformation measurement system based on image processing.

In the present market, a technology based on non-contact image deformation measurement is widely applied and can be used to measure the deformation of whole surface of an object. In implementation, two cameras are combined to form a three-dimensional (3D) measuring device for measuring whole field deformation on object's surface. The device uses characteristics of object's surface for comparing and diagnosing surface displacement. Image capturing process by the cameras and the image correlation are combined to finish measuring of the 3D surface deformation in the fastest way and to obtain the best resolution. Any tiny surface deformation can be shown in data and on the image. Then, through post-processing, displacement and strain of any single dot on surface can also be figured out. However, the device cannot monitor an outdoor scene, such as mountain tendency.

Taiwan Patent No. 1428562, titled "Formation Apparatus Using Digital Image Correlation", discloses that multiple cameras are moved in semi-arc track to given locations to capture images, and by means of changing the contained angles between cameras, the image-capturing range of the cameras can be changed quickly. The cameras of the formation type measurement system are configured in con-arc, so the optical axes of the cameras can be adjusted to cross at a cyclic center of the con-arc to complete definition of outer parameters of the cameras. When the three cameras $C_1$, $C_2$ and $C_3$ are controlled to capture images with multiple angles simultaneously, the formations of camera sets $C_1$-$C_2$, $C_1$-$C_3$ and $C_2$-$C_3$ can be used to perform 3D reconstruction. The present invention is an extension application of the Taiwan Patent No. 1428562, titled "Formation Apparatus Using Digital Image Correlation". In the present invention, multiple cameras can be arbitrary arranged in a non-formation type structure, and a concyclic fitting calculation is performed to build up a con-arc geographic relationship between three cameras in a single circle.

During a 3D reconstruction, a base line process and a camera array are used to search common object feature points matching with each other between the images; however, when a shielding effect is occurred in capturing the multi-angle images of the object, it is not easy to extract the common object feature points, and failure of searching the object features or image matching error may occur. In such situation, the postures of the cameras must be adjusted to perform the 3D reconstruction correctly. In addition, light-sensitive elements of the multiple cameras have different intrinsic parameters (such as image resolutions and focuses of camera lenses) and the manual adjustment errors exist, so the images captured by adjacent cameras have different vertical parallax and horizontal parallax, such effects seriously impact the quality of 3D composite image of image system, and it is still necessary to perform a calibration process on the multi-angle images.

What is need is to make capturing of the whole-scene image more convenient and calibrate the images captured in multiple angles for better image quality.

SUMMARY

An exemplary embodiment of the present invention provides a method of determining a whole-scene image by using multiple image-capturing devices. The method includes steps of: (a) arbitrarily selecting a first image-capturing device, a second image-capturing device and a third image-capturing device located in a whole-scene space; (b) determining a first base line, a second base line and a third base line on a basis of the second image-capturing device; (c) calculating coordinates of the first image-capturing device, the second image-capturing device and third image-capturing device; (d) performing a fitting calculation for a co-circle according to the coordinates; (e) calculating a cyclic point and a radius of the co-circle, and a first angle $\theta_1$ and a second angle $\theta_2$; (f) when a number of the image-capturing devices exceeds three, selecting the at least one of the first, second and third image-capturing devices, and two image-capturing devices comprising one image-capturing device other than the first, second and third image-capturing devices, and defining the selected three image-capturing devices as the first, second and third image-capturing devices in the step (a) and then performing the step (a) through step (h) according to the selected three image-capturing devices; (g) calculating a con-cyclic plane of the co-circle, and arranging the first, the second and the third image-capturing devices according to the con-cyclic plane; (h) analyzing images captured by the first, the second and the third image-capturing devices to determine whether an image calibration is required; (i) if it is necessary to perform the image calibration, a parallax elimination process is performed on the captured images; (j) according to the con-cyclic plane, evaluating a correlation between a single circle and the con-cyclic plane joined with each other, so as to obtain a physical quantity analysis result of the whole-scene after analysis of a correlation evaluation report; and (k) determining the whole-scene image according to the physical quantity analysis result.

In an embodiment, the physical quantity analysis result includes a displacement field and a stress field obtained from calculation according to an image correlation.

In an embodiment, the step (i) further includes a step (i1): analyzing the images captured by the first, the second, and the third image-capturing devices to determine whether it is necessary to perform the image calibration because of a vertical parallax or a horizontal parallax existing between different image-capturing devices. The step (j) further includes a step (j1): if it is necessary to perform the image calibration, a parallax elimination process is performed on the images captured.

Therefore, the present invention uses non-contact formation digital image method to arrange the multiple image-capturing devices, so as to achieve the objective of assisting in capturing the whole-scene image. In addition, the present invention also uses the parallax elimination process for captured images to effectively improve the image quality, so as to effectively solve the problems in conventional technology.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION

Figure 1:
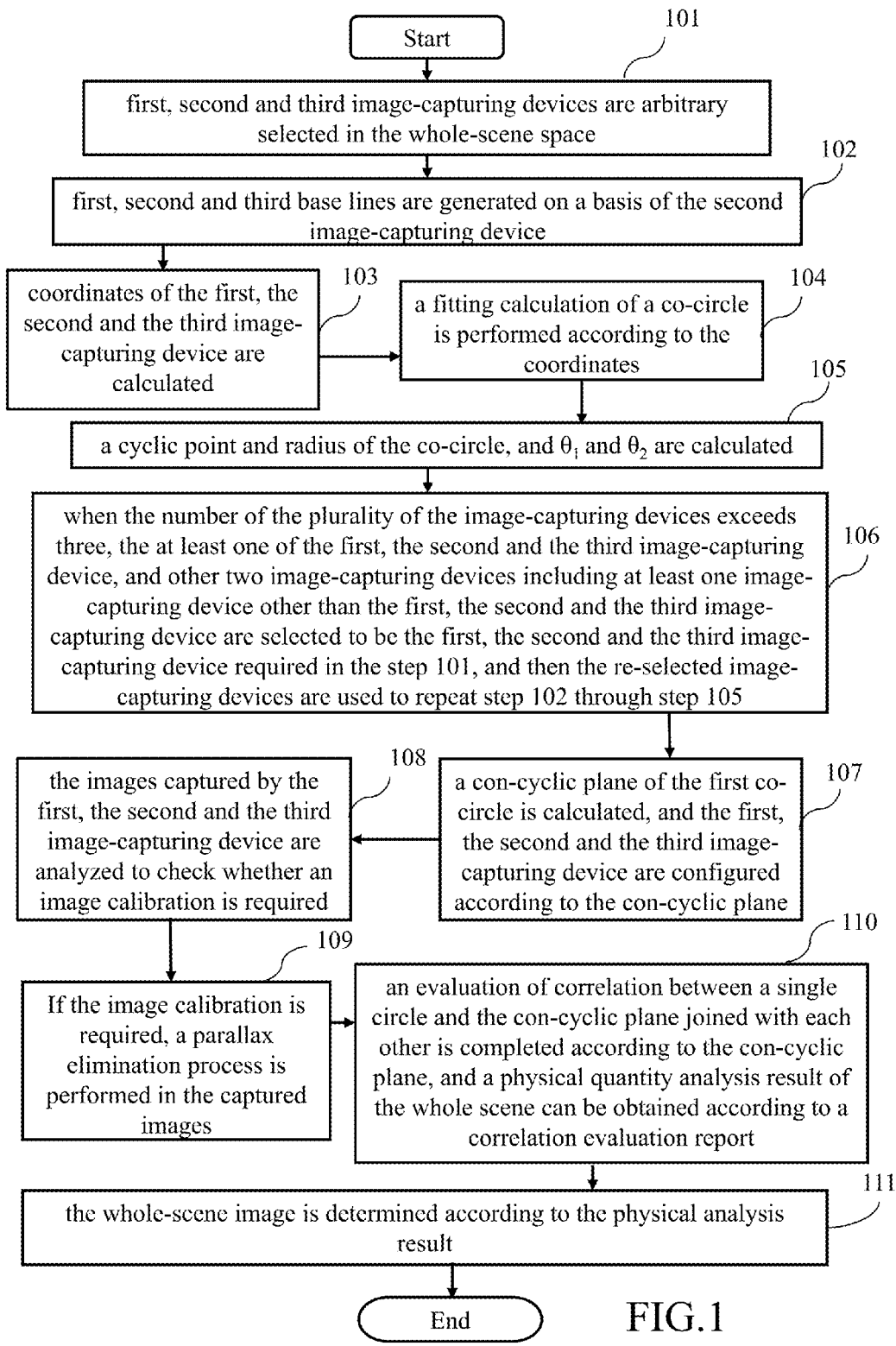
FIG. 1 is a flow chart of a method of the present invention.

The present invention will be apparent from the following detailed description, which proceeds with reference to the accompanying drawings, wherein the same references relate to the same elements.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 which illustrates a method of determining a whole-scene image using multiple image-capturing devices, in accordance with the present invention. Steps of the method will be described in following paragraphs.

The present invention is operated based on non-formation type digital image correlation method, so in a whole-scene space at least three image-capturing devices are required to complete the whole-scene image to achieve the objective of the present invention. That is, the method of the present invention can be completed by three or more image-capturing devices.

First, in step 101, a first image-capturing device 3, a second image-capturing device 4 and a third image-capturing device 5 are arbitrary selected from all available image-capturing devices in the whole-scene space, and the locations and orientations of the selected image-capturing devices will be determined to capture the whole-scene image.

Figure 2:
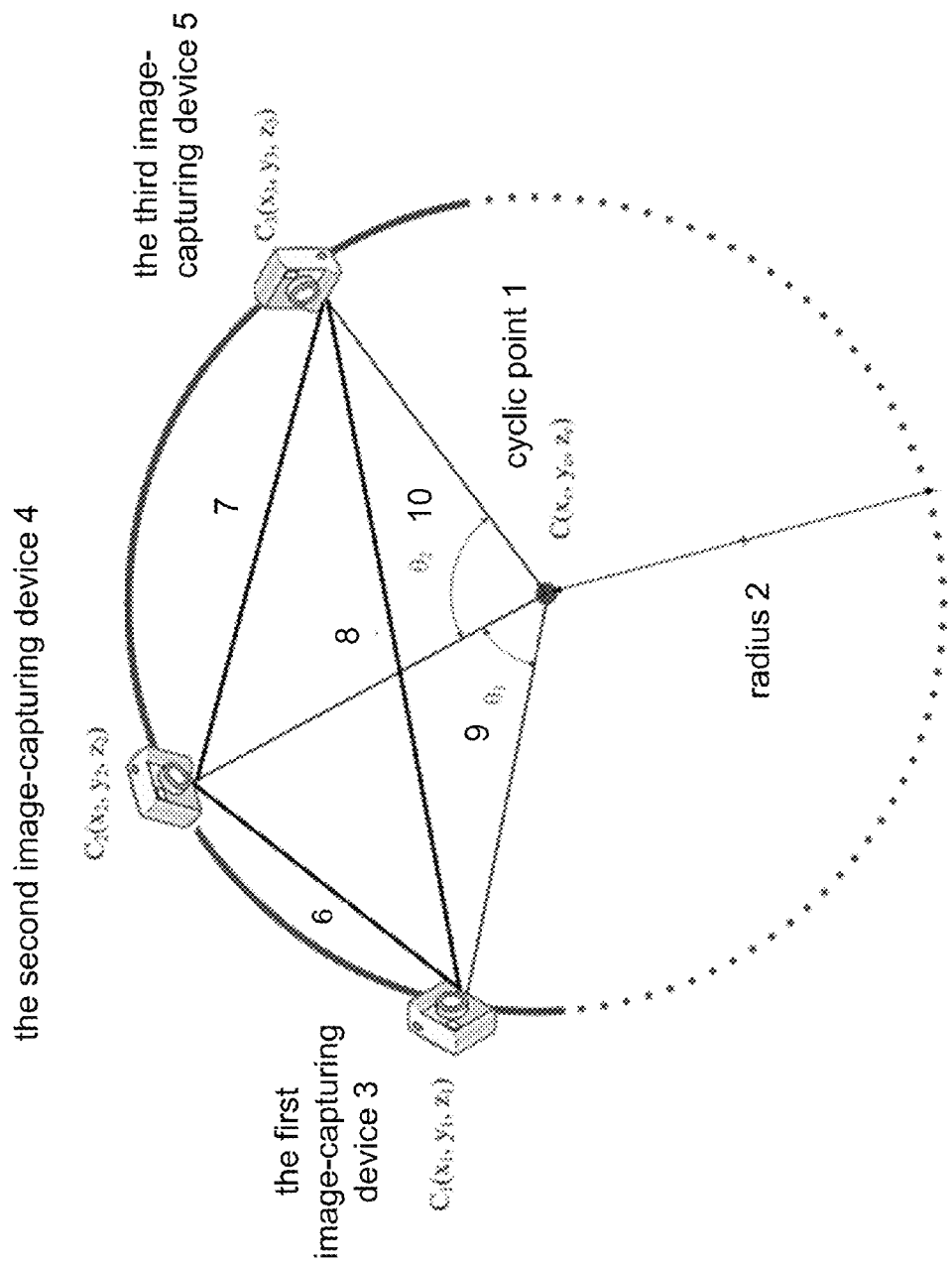
FIG. 2 is a schematic view of step 102 of the method of the present invention.

Next, in step 102, a first base line 6, a second base line 7 and a third base line 8 are generated on a basis of the second image-capturing device 4, as shown in FIG. 2 which is a schematic view of the present invention.

Next, in step 103, coordinates of the first image-capturing device 3, the second image-capturing device 4 and the third image-capturing device 5 are calculated, and the coordinates are indicated by (x1, y1, z1), (x2, y2, z2) and (x3, y3, z3) shown in FIG. 2.

In step 104, a fitting calculation of a co-circle is performed according to the coordinates (x1, y1, z1), (x2, y2, z2) and (x3, y3, z3), so that a cyclic point 1 (x, y, z) and radius of the co-circle and two angles (that is, a first angle $\theta_1$ 9 and a second angle $\theta_2$ 10) can be calculated in step 105, and steps of their calculation are described below.

First, vectors from the first image-capturing device 3 to the second image-capturing device 4, and to the third image-capturing device 5 respectively are defined as $V_1$ and $V_2$, and lengths of vectors from the second image-capturing device 4 to the first image-capturing device 3, and the third image-capturing device 5 respectively are defined as $L_1$ and $L_2$, $$V_1 = C_1(x_1, y_1, z_1) - C_2(x_2, y_2, z_2), V_2 = C_3(x_3, y_3, z_3) - C_2(x_2, y_2, z_2), \quad (1)$$

$$L_1 = \|V_1\|, L_2 = \|V_2\| \circ \quad (2)$$

Next, the first image-capturing device 3, the second image-capturing device 4 and the third image-capturing device 5 are concyclic at a cyclic point 1, and such calculation is referred as fitting calculation. After the coordinate (x, y, z) of cyclic point 1 and the concyclic radiuses 2 of the first image-capturing device 3 and the second image-capturing device 4 are obtained, two angles between the vectors can be calculated by inner product: the angle between the first image-capturing device 3 and the second image-capturing device 4 is $\theta_1$, and the angle between the third image-capturing device 5 and the second image-capturing device 4 is $\theta_2$, $0 \leq \theta_1 \leq \pi$, and the angles $\theta_1$ and $\theta_2$ can be calculated by following formulas:

$$\theta_1 = ar\cos\left(\frac{C_1 \cdot C_2}{\|C_1\|\|C_2\|}\right), \theta_2 = ar\cos\left(\frac{C_2 \cdot C_3}{\|C_2\|\|C_3\|}\right) \circ \quad (3)$$

In step 106, when the number of the plurality of the image-capturing devices exceeds three, the at least one of the first image-capturing device 3, the second image-capturing device 4 and the third image-capturing device 5, and other two image-capturing devices including at least one image-capturing device other than the first image-capturing device 3, the second image-capturing device 4 and the third image-capturing device 5, are selected to be the first image-capturing device 3, the second image-capturing device 4 and the third image-capturing device 5 required in the step 101. Next, the re-selected image-capturing devices are used to repeat step 102 through step 105.

For example, when there are four image-capturing devices, a fourth image-capturing device 11 and any two of the first image-capturing device 3, the second image-capturing device 4 and the third image-capturing device 5 can form a co-circle (not shown in Figs) according to the above manner, so that two jointed circles (not shown in Figs) can be formed and the fourth image-capturing device 11 is assigned as a target of whole scene of the second co-circle, and an orientation of the fourth image-capturing device 11 is determined.

Figure 3:
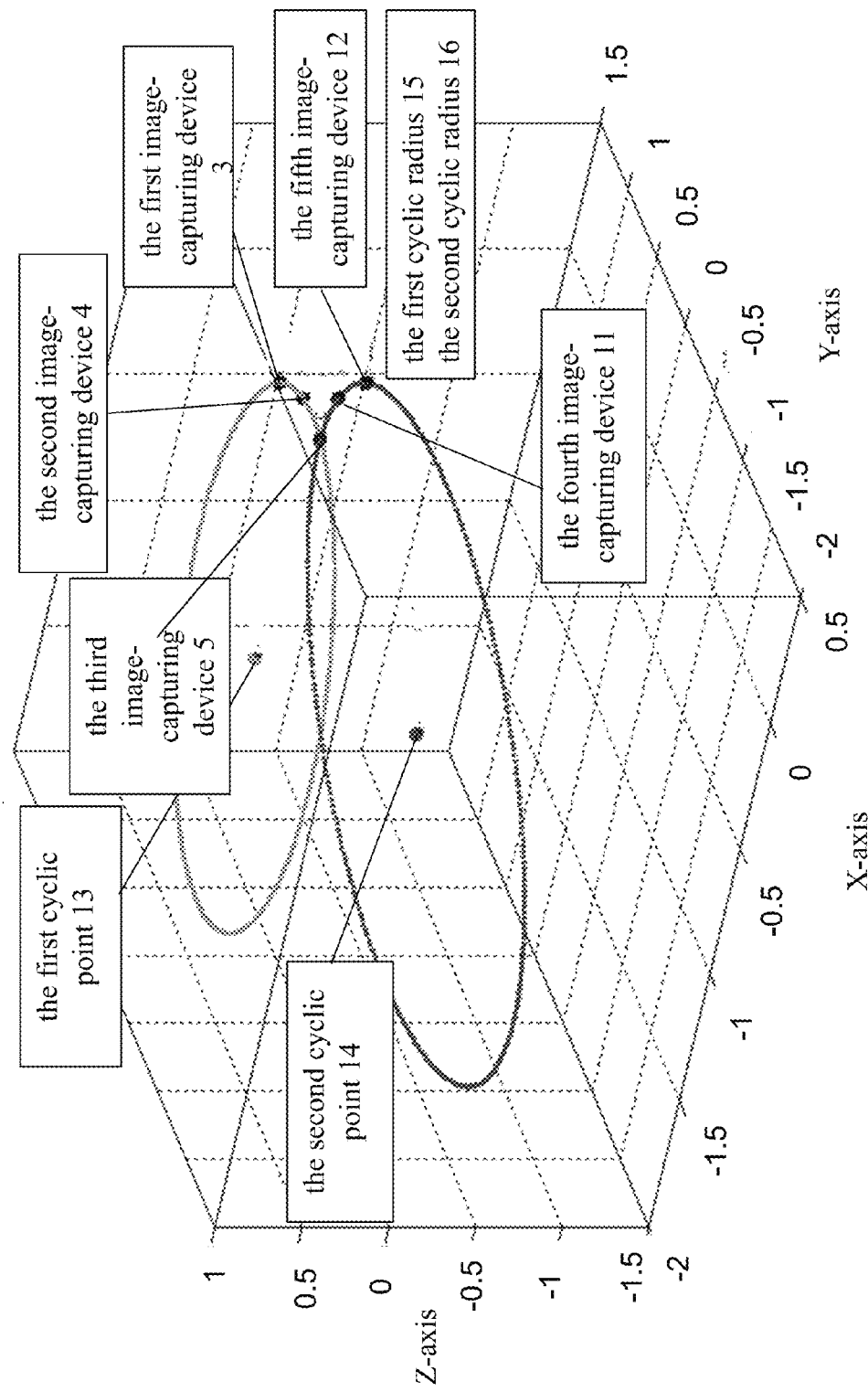
FIG. 3 is a schematic view of locations and orientations of five image-capturing devices of the present invention.

When the number of the total image-capturing devices is five, as shown in FIG. 3 which is a schematic view of locations and orientations of the five image-capturing devices of the present invention. In this case, the fourth image-capturing device 11, the fifth image-capturing device 12, and any one of the first image-capturing device 3, the second image-capturing device 4 and the third image-capturing device 5 are formed as a second co-circle which is jointed with the first co-circle, so that the fourth image-capturing device 11 and the fifth image-capturing device 12 are assigned as the targets of the whole scene of the second co-circle, and the orientations of the fourth image-capturing device 11 and the fifth image-capturing device 12 are determined. As shown in FIG. 3, it is assumed that the coordinate of the first image-capturing device 3 is p1=[0, 0.5, 0.5], the coordinate of the second image-capturing device 4 is p2=[0.1, 0.2, 0.5], and the coordinate of the third image-capturing device 5 is p3=[0.1, −0.1, 0.5], the cyclic point of the first co-circle can be calculated as (−0.85, 0.05, 0.5), and the concyclic radius is 0.9618, the angle $\theta_1$ is 18.9246 and the angle $\theta_2$ is 17.945. Similarly, the coordinate of the fourth image-capturing device 11 is p4 =[0.1, 0.2, 0.3], the coordinate of the fifth image-capturing device 12 is p5=[0, 0.5, 0] and the coordinate of the third image-capturing device 5 is p3[0.1, —0.1,0.5], so the cyclic point of the second co-circle can be calculated as (0.9045, −0.4136, −0.2955), and the cyclic radius is 1.3192, the angle $\theta_1$ is 19.0192 and the angle $\theta_2$ is 15.7091. The third image-capturing device 5 is the jointed point between the first co-circle and the second co-circle.

In step 107, a con-cyclic plane of the first co-circle is calculated, and the first image-capturing device 3, the second image-capturing device 4 and the third image-capturing device 5 are configured according to the con-cyclic plane, for example, the configuration includes determination of the orientations of the first image-capturing device 3, the second image-capturing device 4 and the third image-capturing device 5. The exemplary embodiment including more than three image-capturing devices is described below.

Images captured by different image-capturing devices may have horizontal parallax and vertical parallax which can be observed on the images, so in step 108 the images captured by the first image-capturing device 3, the second image-capturing device 4 and the third image-capturing device 5 are analyzed to check whether an image calibration is required.

If the image calibration is required, in step 109 an image calibration process is performed in the captured images. The image calibration process is referred as a parallax elimination process in the present invention.

In step 110, an evaluation of correlation between a single circle and the con-cyclic plane joined with each other is completed according to the con-cyclic plane, and a physical quantity analysis result of the whole scene can be obtained according to a correlation evaluation report. The physical quantity analysis result includes a displacement field and a stress field. The technology is well-known by the persons skilled in the art and introduced in the background of the present invention, so its detailed description is omitted.

Next, the whole-scene image is determined according to the physical analysis result in step 111. The images captured by all image-capturing devices can processed according to the above steps upon demand, and the processed images can achieve a more ideal and desired image quality.

Figure 4A:
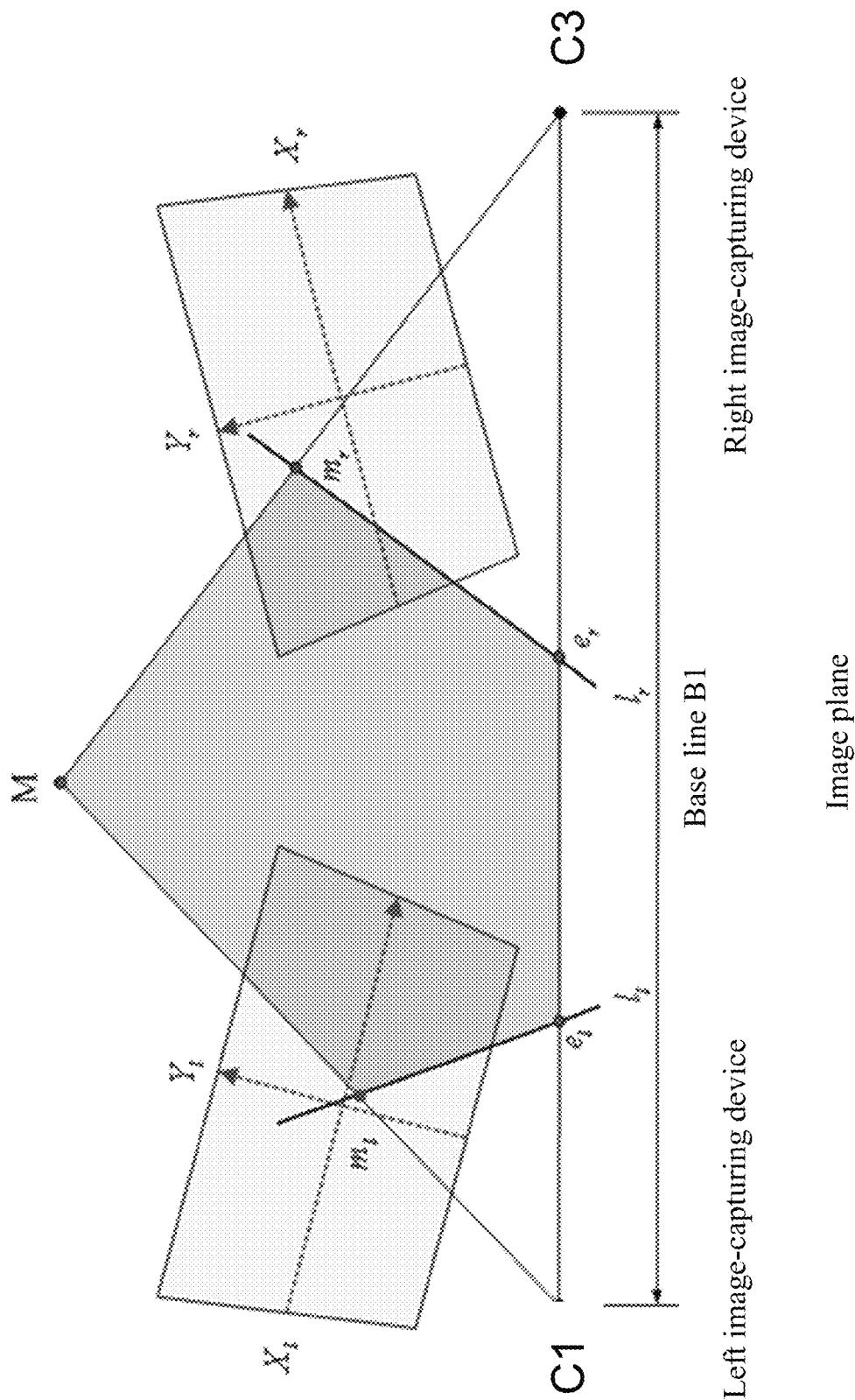
FIGS. 4a and FIG. 4b are schematic views of a parallax elimination calibration process of the present invention, illustrating images captured by a pair of image-capturing devices before and after rectification process.
Figure 4B:
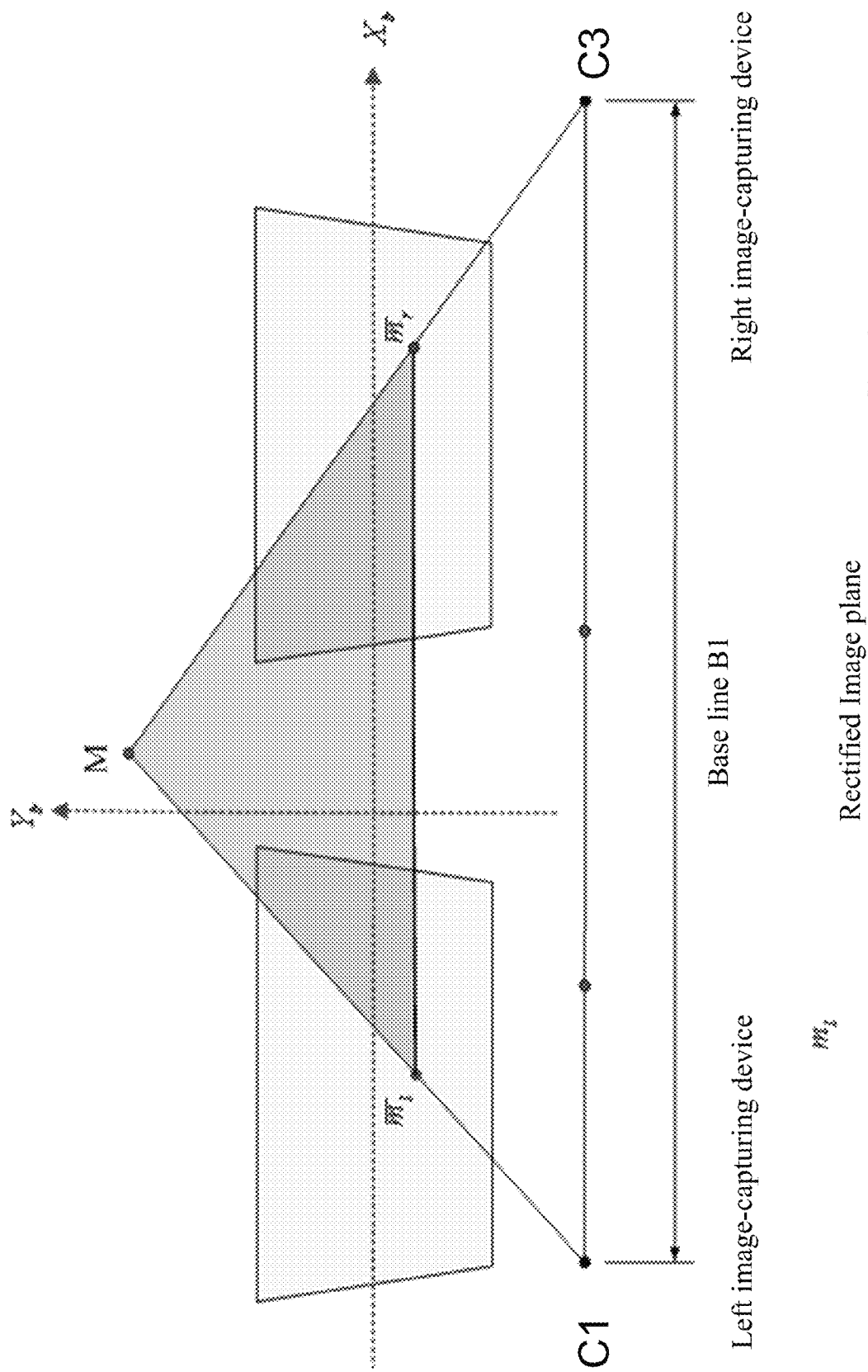
Figure 5B:
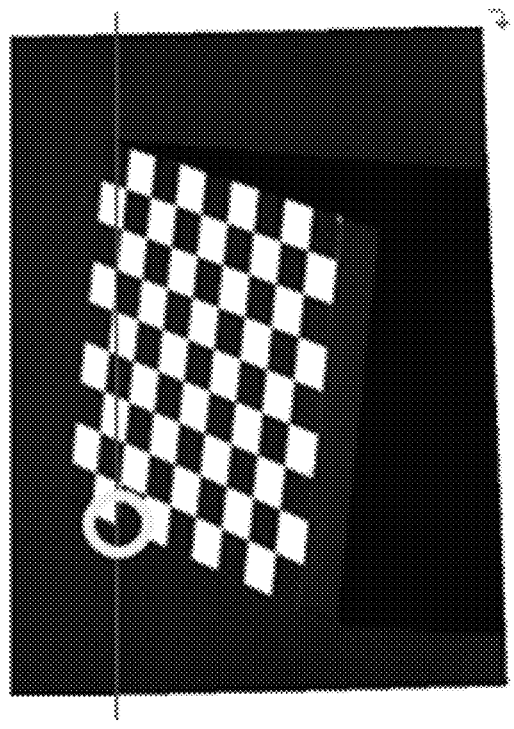
FIGS. 5a and FIG. 5b are schematic views of images before and after rectification process of the present invention.
Figure 5A:
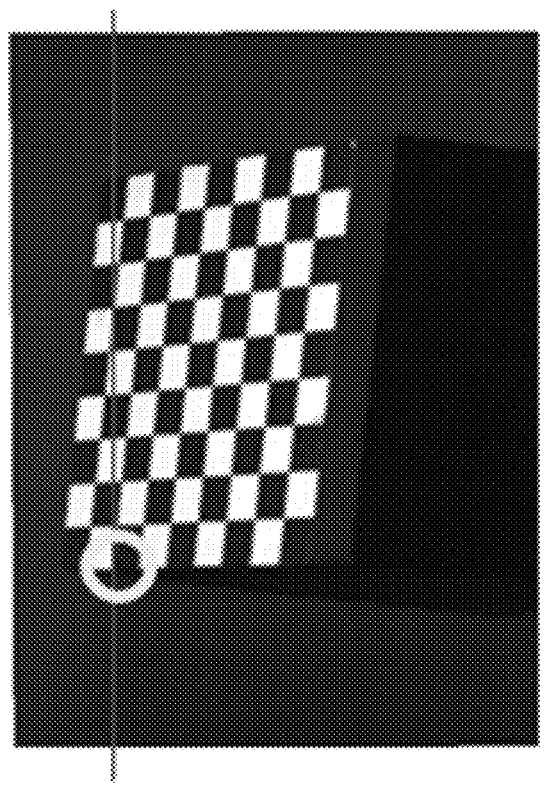

The calibration for the horizontal parallax is described below. A pair of images captured from independent angles and viewing ranges are taken as an example. Please refer to FIGS. 4*a* and 4*b* which are schematic views of parallax elimination process of the present invention, illustrating that the images captured by different image-capturing device before and after rectification process an image rectification process is used to transform the pair of captured images to a rectification image plane. The rectification image plane is defined as a plane in which U axis or V axis of each captured image is parallel to base lines B1 of the left image-capturing device C1 and the right image-capturing device C3. The definition of the rectification image plane is depended on the arrangement of the image-capturing devices C1 and C3. For example, when the image-capturing devices C1 and C3 are arranged in left and right positions, the definition is that the U axis of the image is parallel to the base line B1 of the image-capturing device. The corresponding points ml and mr of the left and right images after the rectification process can be searched along the same horizontal axis, such as the x horizontal axis shown in FIG. 4*b*. The rectification process has an advantage in that the searching computation becomes simple and quick. The process of searching the left and right corresponding points ml and mr is performed along a horizontal polar line because the polar line is parallel to the base line B1 which is rectified to be parallel to the U axis of the image. The image before and after the rectification process is shown in FIGS. 5*a* and 5*b*, respectively. Next, a 3D matching process is performed on the rectified images directly, and the way of performing the rectification process in advance can improve the accuracy of the 3D matching process, and reduce time of adjusting horizontal angles of the two image-capturing devices by using precision machine during image capturing. The polar line and 3D matching process are technologies well-known by the persons skilled in the art, so their detailed descriptions are omitted.

In summary, the present invention discloses a method of determining the whole-scene image by using multiple image-capturing devices, and the method has two main features including non-contact formation digital image method which uses co-circle fitting calculation to determine the location and orientation of each of the image-capturing devices, and the parallax elimination process for captured images. The former can determine the locations and orientations of the image-capturing devices easily to achieve the objective of assisting image capturing; the latter can effectively improve the image quality. Therefore, the present invention can effectively solve the problems in prior art.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of determining a whole-scene image by using multiple image-capturing devices, comprising:
 (a) arbitrarily selecting a first image-capturing device, a second image-capturing device and a third image-capturing device located in a whole-scene space;
 (b) determining a first base line, a second base line and a third base line on a basis of the second image-capturing device;
 (c) calculating coordinates of the first image-capturing device, the second image-capturing device and third image-capturing device;
 (d) performing a fitting calculation for a co-circle according to the coordinates;
 (e) calculating a cyclic point and a radius of the co-circle, and a first angle $\theta_1$ and a second angle $\theta_2$;
 (f) when a number of the image-capturing devices exceeds three, selecting the at least one of the first, second and third image-capturing devices, and two image-capturing devices comprising one image-capturing device other than the first, second and third image-capturing devices, and defining the selected three image-capturing devices as the first, second and third image-capturing devices in the step (a) and then performing the step (a) through step (h) according to the selected three image-capturing devices;
 (g) calculating a con-cyclic plane of the co-circle, and arranging the first, the second and the third image-capturing devices according to the con-cyclic plane;
 (h) analyzing images captured by the first, the second and the third image-capturing devices to determine whether an image calibration is required;
 (i) according to the con-cyclic plane, evaluating a correlation between a single circle and the con-cyclic plane joined with each other, so as to obtain a physical quantity analysis result of the whole-scene after analysis of a correlation evaluation report; and
 (j) determining the whole-scene image according to the physical quantity analysis result.

2. The method according to claim 1, wherein the physical quantity analysis result comprises a displacement field and a stress field obtained from calculation according to an image correlation.

3. The method according to claim 1, wherein the step (h) further comprises:
 (h1) analyzing the images captured by the first, the second, and the third image-capturing devices to determine whether it is necessary to perform the image calibration because of a vertical parallax or a horizontal parallax existing between different image-capturing devices;
 wherein the step (i) further comprises:
 (i1) if it is necessary to perform the image calibration, a parallax elimination process is performed on the images captured.

4. The method according to claim 3, wherein the parallax elimination process comprises a rectification process and a 3D matching process which are in cooperation with each other.

5. A method of determining a whole-scene image by using multiple image-capturing devices, comprising:
 (a) arbitrarily selecting a first image-capturing device, a second image-capturing device and a third image-capturing device located in a whole-scene space;
 (b) determining a first base line, a second base line and a third base line on a basis of the second image-capturing device;
 (c) calculating coordinates of the first image-capturing device, the second image-capturing device and third image-capturing device;
 (d) performing a fitting calculation for a co-circle according to the coordinates;
 (e) calculating a cyclic point and a radius of the co-circle, and a first angle $\theta_1$ and a second angle $\theta_2$;
 (f) when a number of the image-capturing devices exceeds three, selecting the at least one of the first, second and third image-capturing devices, and two image-capturing devices comprising one image-capturing device other than the first, second and third image-capturing devices, and defining the selected three image-capturing devices as the first, second and third image-capturing devices in the step (a) and then performing the step (a) through step (h) according to the selected three image-capturing devices;
 (g) calculating a con-cyclic plane of the co-circle, and arranging the first, the second and the third image-capturing devices according to the con-cyclic plane;
 (h) evaluating a correlation between a single circle and a con-cyclic plane which are jointed with each other, so as to obtain a physical quantity analysis result of the global scene after analysis of a correlation evaluation report; and
 (i) determining the whole-scene image according to the physical quantity analysis result.

6. The method according to claim 5, wherein the physical quantity analysis result comprises a displacement field and a stress field obtained from calculation according to an image correlation.

7. The method according to claim 5, wherein the step (g) further comprises:
 (g1) analyzing the images captured by the first, the second, and the third image-capturing devices to determine whether it is necessary to perform image calibration because of a vertical parallax or a horizontal parallax existing between different image-capturing devices;
 wherein the step (h) further comprises:
 (h1) if it is necessary to perform the image calibration, a parallax elimination process is performed on the captured images.

8. The method according to claim 7, wherein the parallax elimination process comprises a rectification process and a 3D matching process which are in cooperation with each other.

* * * * *